(12) United States Patent
Yuen et al.

(10) Patent No.: US 10,533,601 B2
(45) Date of Patent: Jan. 14, 2020

(54) CASING FOR A FLEXIBLE SHAFT ASSEMBLY OF A VEHICLE POWER SEAT ADJUSTER

(71) Applicant: S.S. White Technologies, Inc., St. Petersburg, FL (US)

(72) Inventors: Tat M. Yuen, Old Bridge, NJ (US); Subramanya Naglapura, St. Petersburg, FL (US)

(73) Assignee: S.S. White Technologies, Inc., St. Petersburg, FL (US)

( * ) Notice: Subject to any disclaimer, the term of this patent is extended or adjusted under 35 U.S.C. 154(b) by 0 days.

(21) Appl. No.: 15/910,157

(22) Filed: Mar. 2, 2018

(65) Prior Publication Data
US 2018/0258978 A1    Sep. 13, 2018

Related U.S. Application Data

(60) Provisional application No. 62/469,851, filed on Mar. 10, 2017.

(51) Int. Cl.
*F16C 1/06*    (2006.01)
*F16C 1/26*    (2006.01)
*B60N 2/02*    (2006.01)

(52) U.S. Cl.
CPC .............. *F16C 1/06* (2013.01); *B60N 2/0232* (2013.01); *F16C 1/26* (2013.01); *B60N 2002/0236* (2013.01)

(58) Field of Classification Search
CPC .......... B60N 2/0232; B60N 2002/0236; B60N 2002/024; F16C 1/06; F16C 1/26; F16D 2300/12
USPC .............. 464/52, 57, 78, 170, 180, 181, 183
See application file for complete search history.

(56) References Cited

U.S. PATENT DOCUMENTS

| | | | |
|---|---|---|---|
| 4,849,038 A * | 7/1989 | Burghardt | F16C 1/02 156/172 |
| 5,791,622 A | 8/1998 | Gauger | |
| 5,820,464 A | 10/1998 | Parlato | |
| 8,328,155 B2 * | 12/2012 | Kostin | B60N 2/0232 248/429 |
| 8,827,820 B1 | 9/2014 | Mellor et al. | |
| 8,925,887 B2 * | 1/2015 | Veen | B60N 2/0232 248/424 |
| 9,528,544 B2 * | 12/2016 | Becker | F16C 1/06 |

* cited by examiner

*Primary Examiner* — Josh Skroupa
(74) *Attorney, Agent, or Firm* — Kim IP Law Group PLLC

(57) ABSTRACT

A flexible shaft assembly of a vehicle power seat adjuster includes a casing having a bracket, and an elongated channel mounted to the bracket, a flexible shaft of a vehicle power seat adjuster received in the elongated channel, and a motor for driving the flexible shaft. The elongated channel includes side walls, a bottom wall and an open top defining an inner cavity for receiving the flexible shaft.

19 Claims, 5 Drawing Sheets

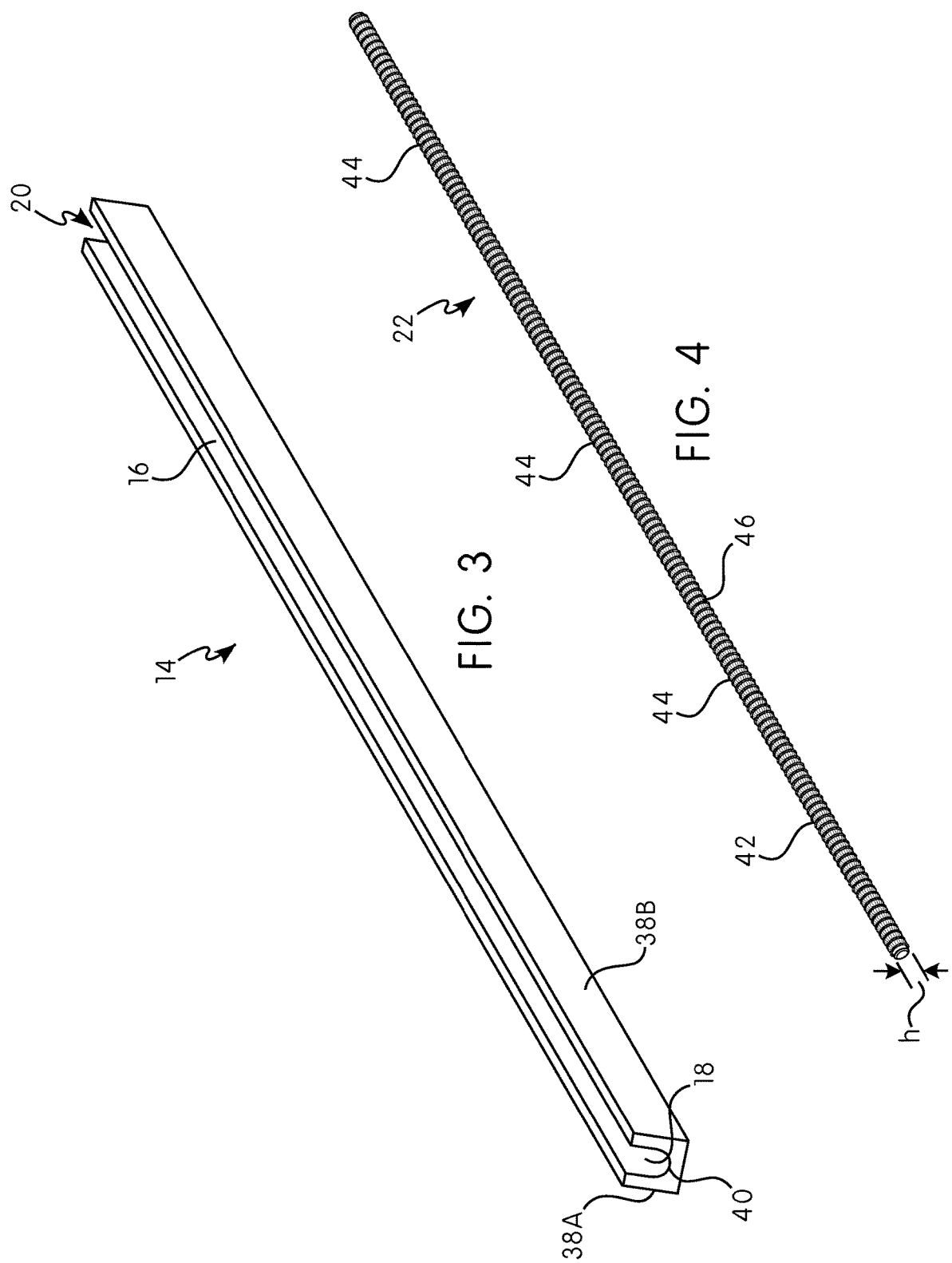

CASING FOR A FLEXIBLE SHAFT ASSEMBLY OF A VEHICLE POWER SEAT ADJUSTER

CROSS-REFERENCE TO RELATED APPLICATIONS

This application claims the benefit of U.S. Provisional Application No. 62/469,851, filed Mar. 10, 2017, entitled "Casing for a Flexible Shaft Assembly of a Vehicle Power Seat Adjuster" the entire disclosure of which is incorporated by reference herein in its entirety for all purposes.

BACKGROUND OF THE INVENTION

Vehicle power seat adjusters typically include a flexible shaft for transmitting torque, for example between a motor and an automobile seat to be adjusted. The shaft may include a core including one or more wire layers helically wound in opposite winding directions. The outer layer may include a number of wires with a circular cross-section and sometimes a gap or two. The wires of the outer layer are typically helically wound in a winding direction opposite to that of an adjacent layer. A strand of flocked yarn is typically wound into the gap and protrudes above the adjacent wires of the outer layer. The strand or strands of yarn is typically only used to provide an interference fit, e.g., to prevent rattling, in the shaft tip interfaces.

Moreover, typical power seat actuator systems consist of a long flexible shaft and a short flexible shaft, with formed squares at the ends, both driven by an electric motor in between them. The long flexible shaft is typically supported inside a tubular casing which is fastened to a bracket that also carries the motor, or the shaft is supported by a tunnel integrated into the bracket. The casing constricts the whipping action of the long shaft, and to dampen the vibration of the shaft inside the casing, the shaft is typically covered with a wound layer of "over-flock" or with "electrostatic flocking". The problem with this configuration is that if the dampening layer is too thick, the friction between shaft and casing is too great, but if it is too thin, it may not be sufficient to prevent resonant vibration. It is difficult to hold this dampening layer within a close tolerance due to the nature of the materials.

BRIEF SUMMARY OF THE INVENTION

In accordance with an exemplary embodiment of the subject application, there is provided a casing design for an automotive power seat flex shaft actuator having a close-fitting channel which may be integrated into an injection-molded actuator bracket/assembly.

In accordance with an exemplary embodiment, there is provided a casing for a flexible shaft of a vehicle power seat adjuster comprising a bracket and an elongated open channel mounted to the bracket for receiving a flexible shaft of a vehicle power seat adjuster. The elongated open channel includes an open top, an open front end, an open rear end. The elongated open channel can be configured to have a substantially U-shaped, square, rectangular, triangular, oval, circular, or trapezoidal shaped longitudinal cross-section. Alternatively, the elongated open channel can be configured to consist of opposing lateral side walls and a bottom wall extending between the opposing lateral side walls.

According to an aspect, the elongated open channel is integrally formed with the bracket. The bracket comprises an opening for receiving a motor for operatively engaging the flexible shaft.

According to an aspect, the bracket comprises an elongated planar base having a front end and a rear end, wherein the elongated planar base is connected to the elongated open channel, a first step flange extending outwardly from the front end, and a second step flange extending outwardly from the rear end.

According to an aspect, the elongated planar base comprises an opening for receiving a motor for operatively engaging the flexible shaft. The elongated planar base is integrally formed with the elongated open channel.

In accordance with a further exemplary embodiment, there is provided a flexible shaft assembly of a vehicle power seat adjuster comprising a flexible shaft configured to drive a vehicle power seat adjuster. The flexible shaft assembly further comprises a casing that includes a bracket, and an elongated open channel mounted to the bracket. The elongated open channel includes an open top, an open front end, and an open rear end. The flexible shaft is housed within the elongated open channel and extends out through the open front end and open rear end. In addition, the flexible shaft assembly comprises a motor mounted on the casing and operatively connected to the flexible shaft for rotating the flexible shaft.

According to an aspect, a maximum material condition of the elongated open channel defines an inner cavity that substantially matches a maximum material condition of the flexible shaft. In accordance with another aspect, an outer circumferential surface of the flexible shaft is spaced from an inner surface of the elongated open channel by less than about 0.1 mm, or less than about 0.001 to 0.010 inches.

According to an aspect, the open rear end of the elongated open channel is spaced from the motor about 5 to 20 mm, or is spaced from an opening in the casing within which the motor is mounted about 10 to 15 mm.

According to an aspect, the elongated open channel includes lateral side walls having a height greater than or equal to a height of the flexible shaft. In accordance with another aspect, the elongated open channel includes a curved bottom wall complementary shaped to an outer surface of the flexible shaft. The flexible shaft comprises a plurality of coiled wires and yarn circumscribing the plurality of coiled wires.

Other features and advantages of the subject disclosure will be apparent from the following more detailed description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings embodiments, which are exemplary. It should be understood, however, that the subject disclosure is not limited to the precise arrangements and instrumentalities shown.

In the drawings:

FIG. 3 is a perspective view of a U-channel of the flexible shaft assembly of FIG. 1A in accordance with an exemplary embodiment of the subject disclosure;

FIG. 4 is a perspective view of a flexible shaft of the flexible shaft assembly of FIG. 1A in accordance with an exemplary embodiment of the subject disclosure.

DETAILED DESCRIPTION OF THE INVENTION

Figure 1A:
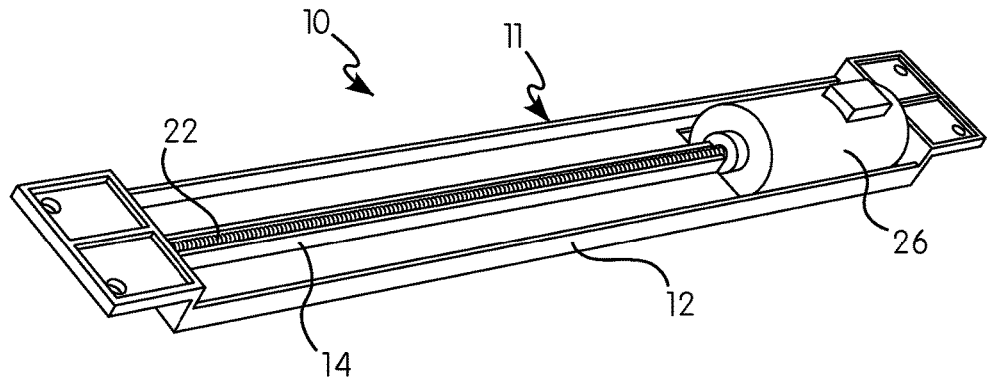
FIG. 1A—is a perspective view of a flexible shaft assembly in accordance with an exemplary embodiment of the subject disclosure.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

The present invention relates generally to a flexible shaft assembly of a vehicle power seat adjuster. In particular, the present invention relates to a casing for a flexible shaft of the flexible shaft assembly.

Referring now to the drawings, FIG. 1A illustrates a flexible shaft assembly 10 of a vehicle power seat adjuster in accordance with an exemplary embodiment of the subject disclosure. The flexible shaft assembly 10 comprises a flexible shaft 22, a casing 11 and a motor 26. The casing includes a bracket 12, and an elongated open channel 14 mounted to the bracket.

Figure 1B:
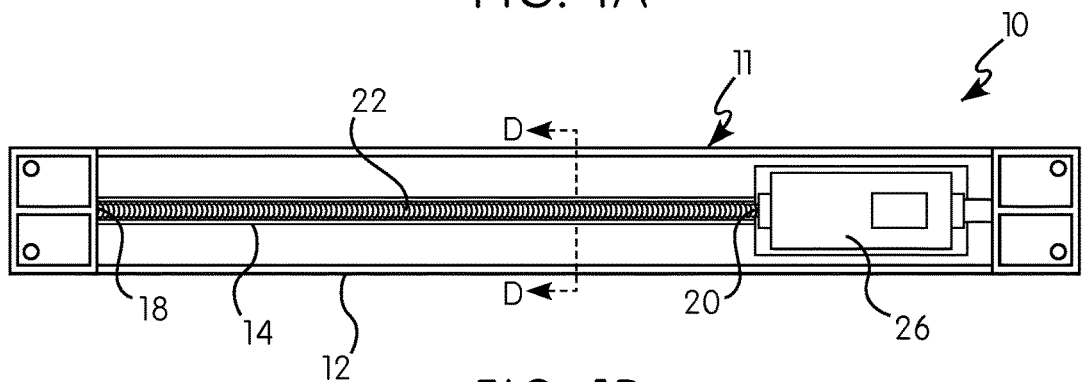
FIG. 1B is a top plan view of the flexible shaft assembly of FIG. 1A.
Figure 1C:
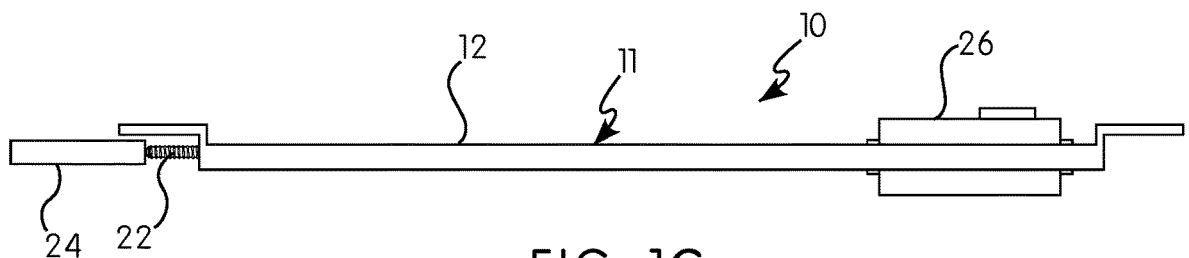
FIG. 1C is a side elevational view of the flexible shaft assembly of FIG. 1A.
Figure 1D:
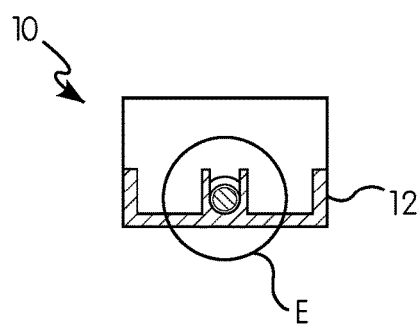
FIG. 1D is a cross-sectional view of the flexible shaft assembly of FIG. 1A taken along line D-D of FIG. 1B.
Figure 1E:
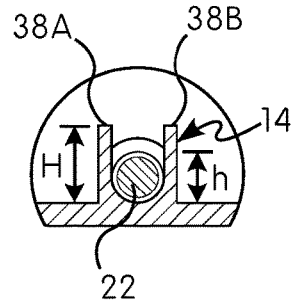
FIG. 1E is an enlarged detail view of the flexible shaft assembly derived from detail E of FIG. 1D.
Figure 2A:
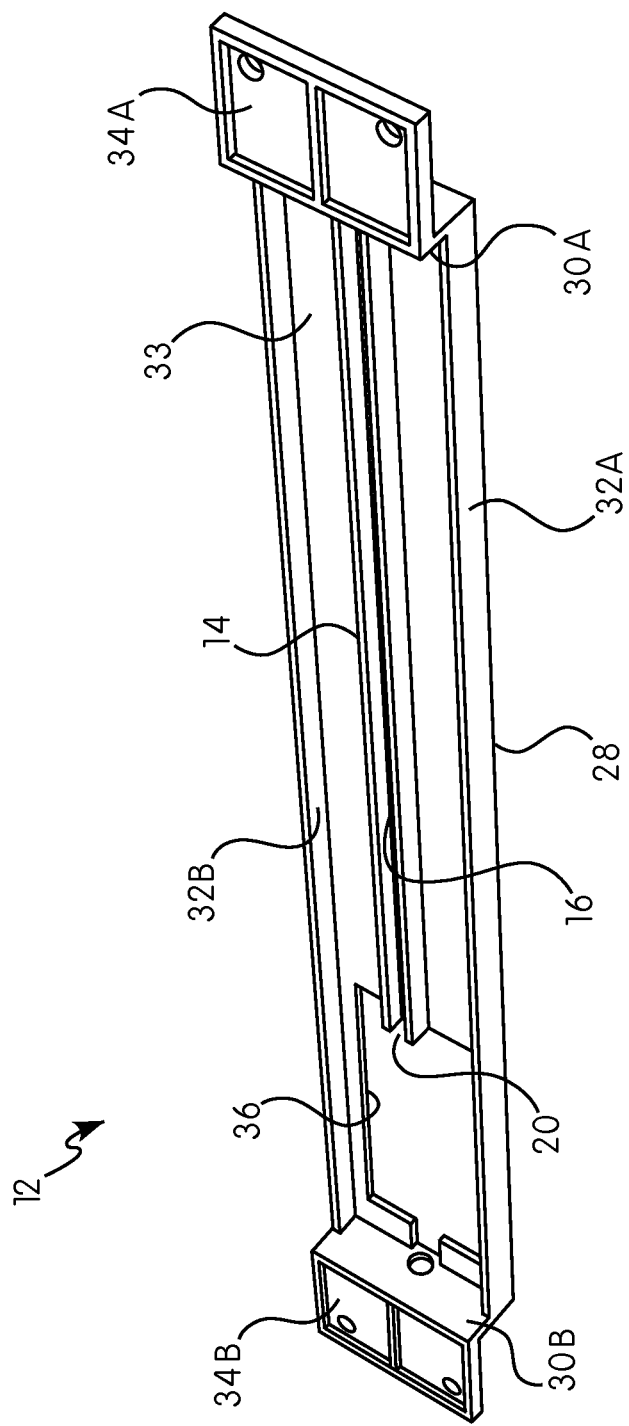
FIG. 2A is a top perspective view of a bracket of the flexible shaft assembly of FIG. 1A in accordance with an exemplary embodiment of the subject disclosure.

As shown in FIGS. 1B, 2A and 3, the elongated open channel includes an open top 16, an open front end 18, and an open rear end 20. The flexible shaft 22 is configured to drive a vehicle power seat adjuster 24 (FIG. 1C) and is received or housed within the elongated open channel and extends out through the open front end and open rear end of the channel. The motor 26 is mounted on the casing and operatively connected to the flexible shaft 22 for rotating the flexible shaft. FIGS. 1A-1E illustrate various views of the flexible shaft assembly 10 in an assembled configuration or state.

Figure 2B:
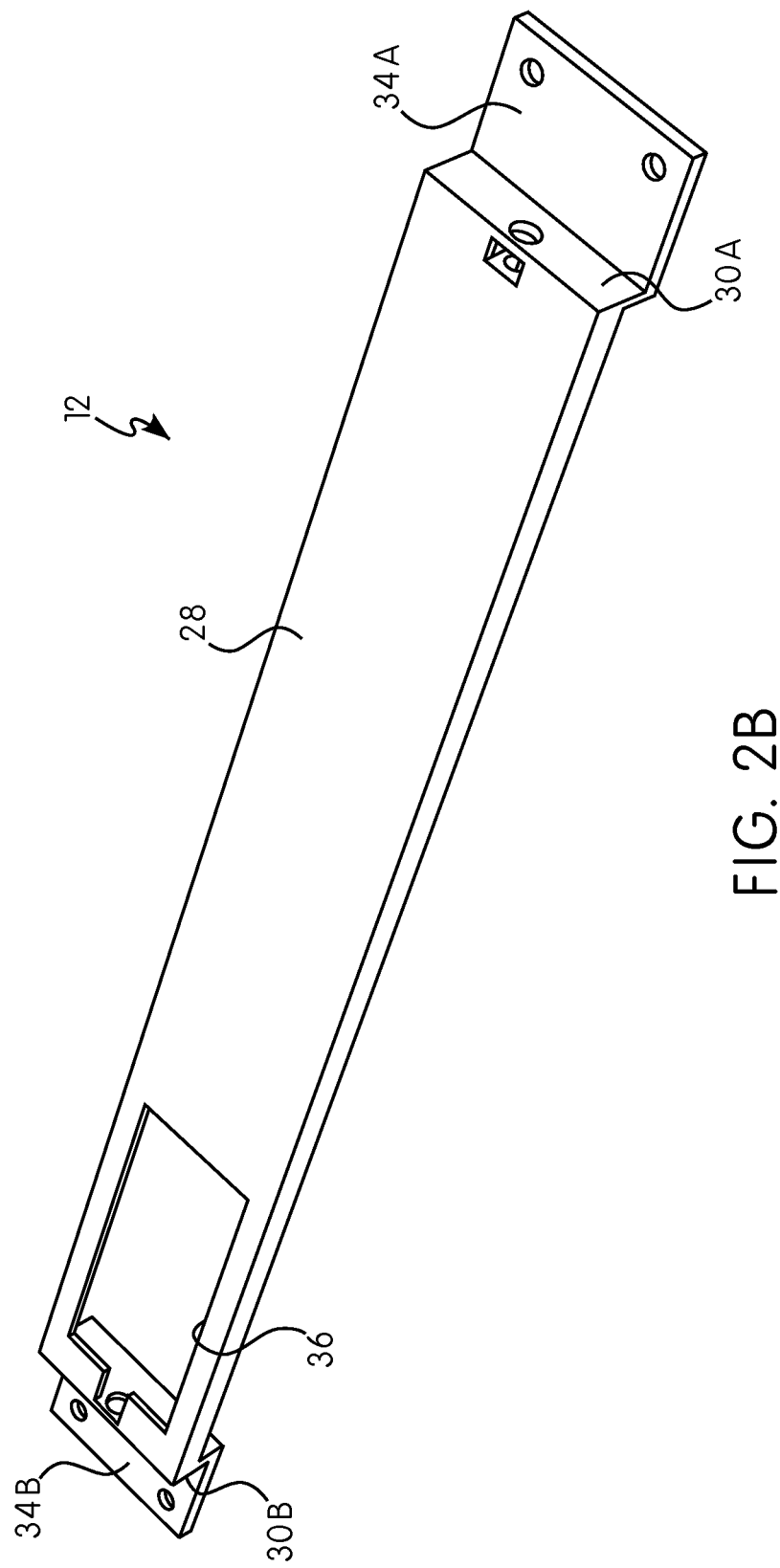
FIG. 2B is a bottom perspective view of the bracket of FIG. 1A.

In accordance with an exemplary embodiment, the bracket 12 is configured as best shown in FIGS. 2A and 2B. The bracket comprises an elongated planar base 28 having a front end 30A and a rear end 30B. The elongated planar base is connected to the elongated open channel 14. The bracket includes opposing lateral side walls 32A, 32B, and a bottom wall 33 extending between the opposing lateral side walls. The bracket further comprises a first step flange 34A extending outwardly from the front end 30A, and a second step flange extending outwardly from the rear end 30B. The elongated planar base 28 of the bracket also includes an opening 36 for receiving the motor 26 which operatively engages the flexible shaft 22. While the bracket 12 is configured as shown, the bracket can alternatively be configured in other suitable configurations capable of receiving or serving as a mount for the elongated open channel 14 for use in casing the flexible shaft 22.

According to an exemplary embodiment, the elongated planar base 28 of the bracket 12 is integrally formed with the elongated open channel 14 such as by injection molding or the like.

In accordance with an exemplary embodiment, the elongated open channel 14 is configured as best shown in FIGS. 2A and 3. In the illustrated example, the channel 14 is an elongated channel having an open top 16 and a substantially U-shaped interior cavity specifically sized to receive the flexible shaft 22. In particular, the channel includes opposing lateral side walls 38A, 38B, each having substantially planar outer wall surfaces, and a curved bottom wall 40 extending between the opposing lateral side walls. The curved bottom wall 40 is complementary shaped to an outer surface 42 (FIG. 4) of the flexible shaft 22. Referring to FIG. 1E, the lateral side walls 38A, 38B of the elongated open channel 14 have a height "H" greater than or equal to a height "h" of the flexible shaft 22.

The elongated open channel 14 can alternatively be configured as a generally open top elongated channel, but with a differing longitudinal cross-section than that of a substantially U-shaped longitudinal cross-section. For example, the elongated open channel may have a square, a rectangular, a triangular, an oval, a circular, or a trapezoidal shaped longitudinal cross-section.

The elongated open channel 14 is sized to mount on the bracket 12, as shown in FIG. 2A. However, the open rear end 20 of the channel 14 may be spaced from the opening 36 in the casing within which the motor 26 is received about 10 to 15 mm. Alternatively, the open rear end 20 of the channel 14 may be spaced from the motor 26 about 5 to 20 mm.

In accordance with an exemplary embodiment, the flexible shaft 22 is configured as best shown in FIG. 4, but can alternatively be configured as any other flexible shaft known in the art and applicable for vehicle power seat adjusters. As shown in FIG. 4, the flexible shaft comprises a plurality of coiled wires 44 and yarn 46 circumscribing the plurality of coiled wires. Exemplary flexible shafts applicable to the present invention are disclosed in, e.g., U.S. Pat. Nos. 8,827,820; 5,820,464; and 5,791,622, the entire disclosures of which are hereby incorporated by reference herein in their entirety for all purposes.

Figure 5:
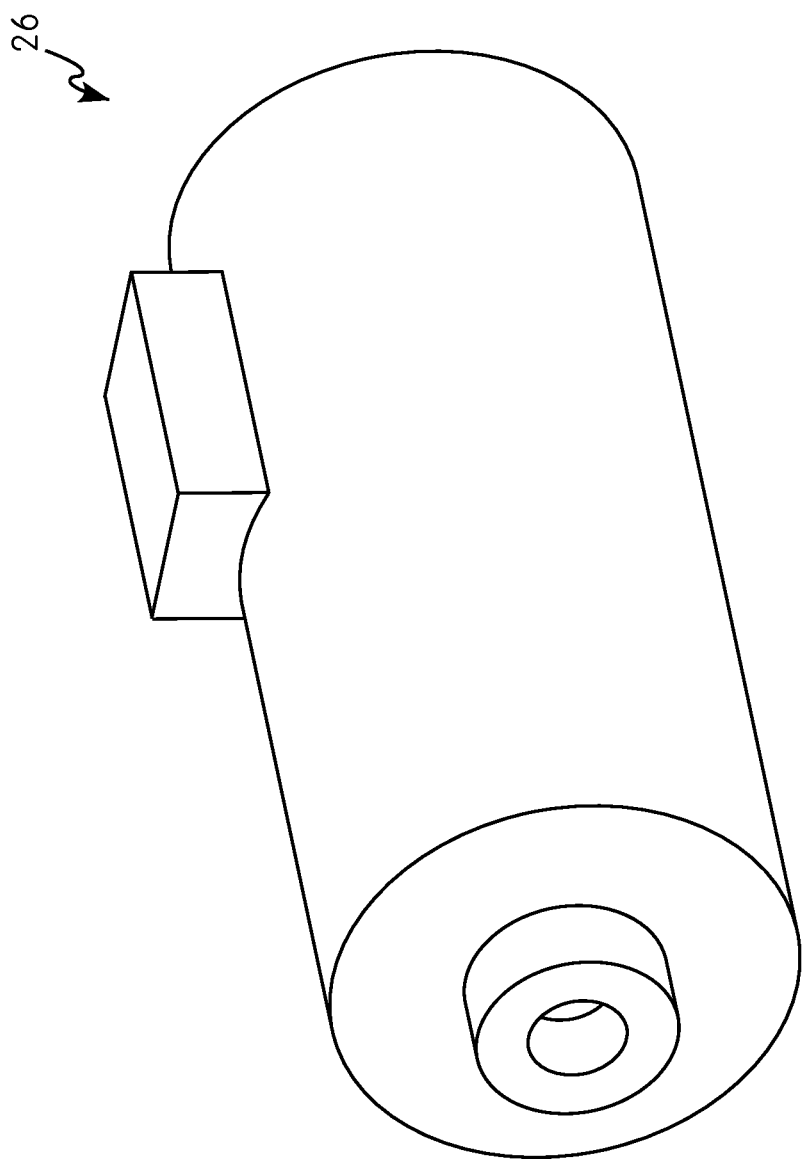
FIG. 5 is a perspective view of a motor of the flexible shaft assembly of FIG. 1A in accordance with an exemplary embodiment of the subject disclosure.

In accordance with an exemplary embodiment, the motor 26 is shown in FIG. 5. The motor can be any motor suitable for the intended purpose of driving rotation of the flexible shaft 22. For example, the motor 26 can be an electric motor. Other exemplary motors applicable to the present invention are disclosed in, e.g., U.S. Pat. No. 5,791,622, the entire disclosure of which is hereby incorporated by reference herein in its entirety for all purposes.

Referring back to FIGS. 1A, 1B, 1D and 1E, the elongated open channel 14 is sized to provide a fit with the flexible shaft 22 so that any gap spacing between the outer surface of the flexible shaft and the inner walls of the channel is minimized. For example, the channel is configured such that its inner cavity at a maximum material condition substantially matches a maximum material condition of the flexible shaft without causing an interference fit. Preferably, an outer circumferential surface of the flexible shaft is spaced from an inner surface of the elongated open channel by less than 0.1 mm.

Alternatively, the elongated open channel can be configured such that its inner cavity at a maximum material condition matches a maximum material condition of the flexible shaft. Alternatively, an outer circumferential surface of the flexible shaft is spaced from an inner surface of the elongated open channel by less than about 0.001 inches to 0.010 inches.

The present exemplary embodiments of the subject disclosure advantageously provide for a casing for a flexible shaft that reduces or prevents unwanted and undesirable noise or acoustics associated with conventional tubular casings. For example, owing to the open-top channel configuration, the casing of the exemplary embodiments induces less friction between the flexible shaft and the casing and eliminates various modes of acoustic amplification associated with tubular casings.

Additionally, the present exemplary embodiments advantageously provide improved ease of installation and improved ease of manufacture, and less potential for detrimental acoustics during use. For example, the flexible shaft can be rotated for formed square alignment, and the flexible shaft can be installed after seat track halves are assembled. Additionally, amplitude of lateral vibration ("whipping" or "whirling") is minimized because the clearance or gap spacing between the casing and flexible shaft is minimized. Further, compared to the flexible shaft in a tube design, there is less friction between the casing and the flexible shaft because there is no contact on one side of the casing. Furthermore, a straight-walled elongated channel, which is open at the top, is easy to incorporate into an actuator injection-molded bracket/assembly. Eliminating conventional tube casing also eliminates all the alignment and tolerance stack-up issues associated with such flexible shaft and tube casing assemblies.

An important benefit to having such a small clearances in the exemplary embodiment is that a spiral flock shaft can be used without over-flock or electrostatic flocking, reducing cost, complexity, tolerance stack up, and potential failure modes associated with that extra component. With a tube or tunnel casing, the internal diameter must be greater than the maximum "across-corner" dimension of the flexible shaft formed squares so that the formed squares can be inserted into the tube or tunnel. Further, compared to the over flocked or electrostatically flocked flexible shaft in a tube design, in the present invention there is less friction between the casing and the flexible shaft because there is no contact on one side of the casing and because of lower density flocking.

It will be appreciated by those skilled in the art that changes could be made to the exemplary embodiments described above without departing from the broad inventive concept thereof. It is to be understood, therefore, that this disclosure is not limited to the particular exemplary embodiments disclosed, but it is intended to cover modifications within the spirit and scope of the subject disclosure as defined by the appended claims.

We claim:

1. A casing for a flexible shaft of a vehicle power seat adjuster comprising:
   a bracket; and
   an elongated open channel mounted to the bracket having its longitudinal axis extending substantially parallel to a longitudinal axis of the bracket for receiving a flexible shaft of a vehicle power seat adjuster, wherein the elongated open channel includes an open front end, an open rear end and an open top extending continuously from the open front end to the open rear end.

2. The casing of claim 1, wherein the elongated open channel has a substantially U-shaped, square, rectangular, triangular, oval, circular, or trapezoidal shaped longitudinal shaped cross-section.

3. The casing of claim 1, wherein the elongated open channel consists of opposing lateral side walls and a bottom wall extending between the opposing lateral side walls.

4. The casing of claim 1, wherein the elongated open channel is integrally formed with the bracket.

5. The casing of claim 1, wherein the bracket comprises an opening for receiving a motor for operatively engaging the flexible shaft.

6. The casing of claim 1, wherein the bracket comprises:
   an elongated planar base having a front end and a rear end, wherein the elongated planar base is connected to the elongated open channel;
   a first step flange extending outwardly from the front end; and
   a second step flange extending outwardly from the rear end.

7. The casing of claim 6, wherein the elongated planar base comprises an opening for receiving a motor for operatively engaging the flexible shaft.

8. The casing of claim 6, wherein the elongated planar base is integrally formed with the elongated open channel.

9. A flexible shaft assembly of a vehicle power seat adjuster comprising:
   a flexible shaft configured to drive a vehicle power seat adjuster;
   a casing that includes:
      a bracket, and
      an elongated open channel mounted to the bracket having its longitudinal axis extending substantially parallel to a longitudinal axis of the bracket, the elongated open channel including an open front end, an open rear end and an open top extending continuously from the open front end to the open rear end,
   wherein the flexible shaft is housed within the elongated open channel and extends out through the open front end and open rear end; and
   a motor mounted on the casing and operatively connected to the flexible shaft for rotating the flexible shaft.

10. The flexible shaft assembly of claim 9, wherein a maximum material condition of the elongated open channel defines an inner cavity that substantially matches a maximum material condition of the flexible shaft.

11. The flexible shaft assembly of claim 9, wherein an outer circumferential surface of the flexible shaft is spaced from an inner surface of the elongated open channel by less than about 0.1 mm.

12. The flexible shaft assembly of claim 9, wherein an outer circumferential surface of the flexible shaft is spaced from an inner surface of the elongated open channel by less than about 0.001 to 0.010 inches.

13. The flexible shaft assembly of claim 9, wherein the open rear end of the elongated open channel is spaced from the motor about 5 to 20 mm.

14. The flexible shaft assembly of claim 9, wherein the open rear end of the elongated open channel is spaced from an opening in the casing within which the motor is mounted about 10 to 15 mm.

15. The flexible shaft assembly of claim 9, wherein the elongated open channel includes lateral side walls having a height greater than or equal to a height of the flexible shaft.

16. The flexible shaft assembly of claim 9, wherein the elongated open channel includes a curved bottom wall complementary shaped to an outer surface of the flexible shaft.

17. The flexible shaft assembly of claim 9, wherein the flexible shaft comprises a plurality of coiled wires and yarn circumscribing the plurality of coiled wires.

18. The flexible shaft assembly of claim 9, wherein the bracket comprises:
   an elongated planar base having a front end and a rear end, wherein the elongated planar base is connected to the elongated open channel;
   a first step flange extending outwardly from the front end; and
   a second step flange extending outwardly from the rear end.

19. A flexible shaft assembly of a vehicle power seat adjuster consisting essentially of:
   a flexible shaft configured to drive a vehicle power seat adjuster;
   a casing that includes:
      a bracket, and
      an elongated open channel mounted to the bracket having its longitudinal axis extending substantially parallel to a longitudinal axis of the bracket, the elongated open channel including an open front end, an open rear end and an open top extending continuously from the open front end to the open rear end,
   wherein the flexible shaft is housed within the elongated open channel and extends out through the open front end and open rear end; and
   a motor mounted on the casing and operatively connected to the flexible shaft for rotating the flexible shaft.

* * * * *